Dec. 11, 1956  C. C. SAXON  2,773,704
RESILIENT DRAFT MEANS WITH PLURAL ARTICULATION AXES
Filed July 30, 1954  2 Sheets-Sheet 1
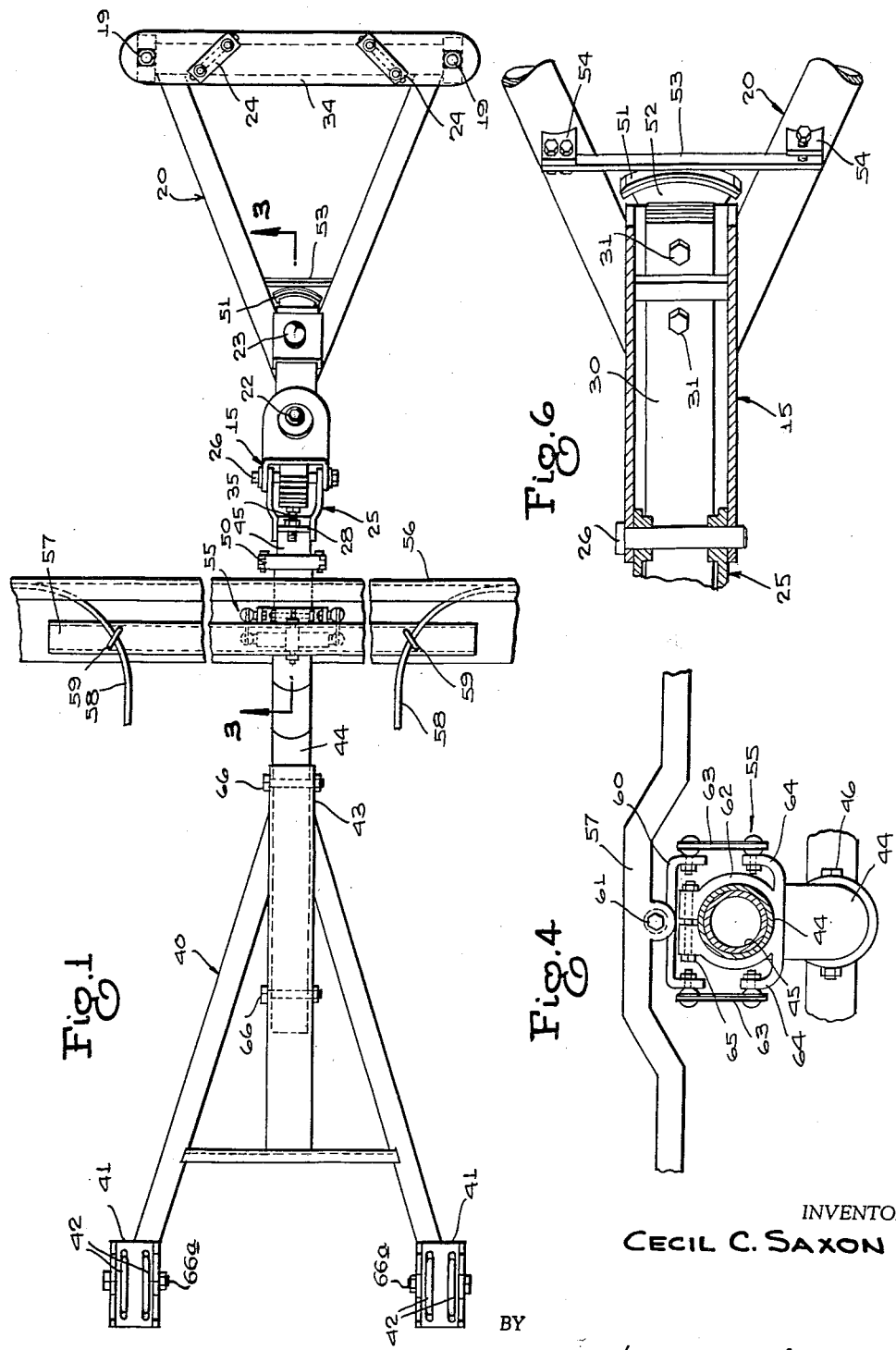
INVENTOR
CECIL C. SAXON
BY
McMorrow, Berman + Davidson
ATTORNEYS Dec. 11, 1956  C. C. SAXON  2,773,704
RESILIENT DRAFT MEANS WITH PLURAL ARTICULATION AXES
Filed July 30, 1954.  2 Sheets-Sheet 2
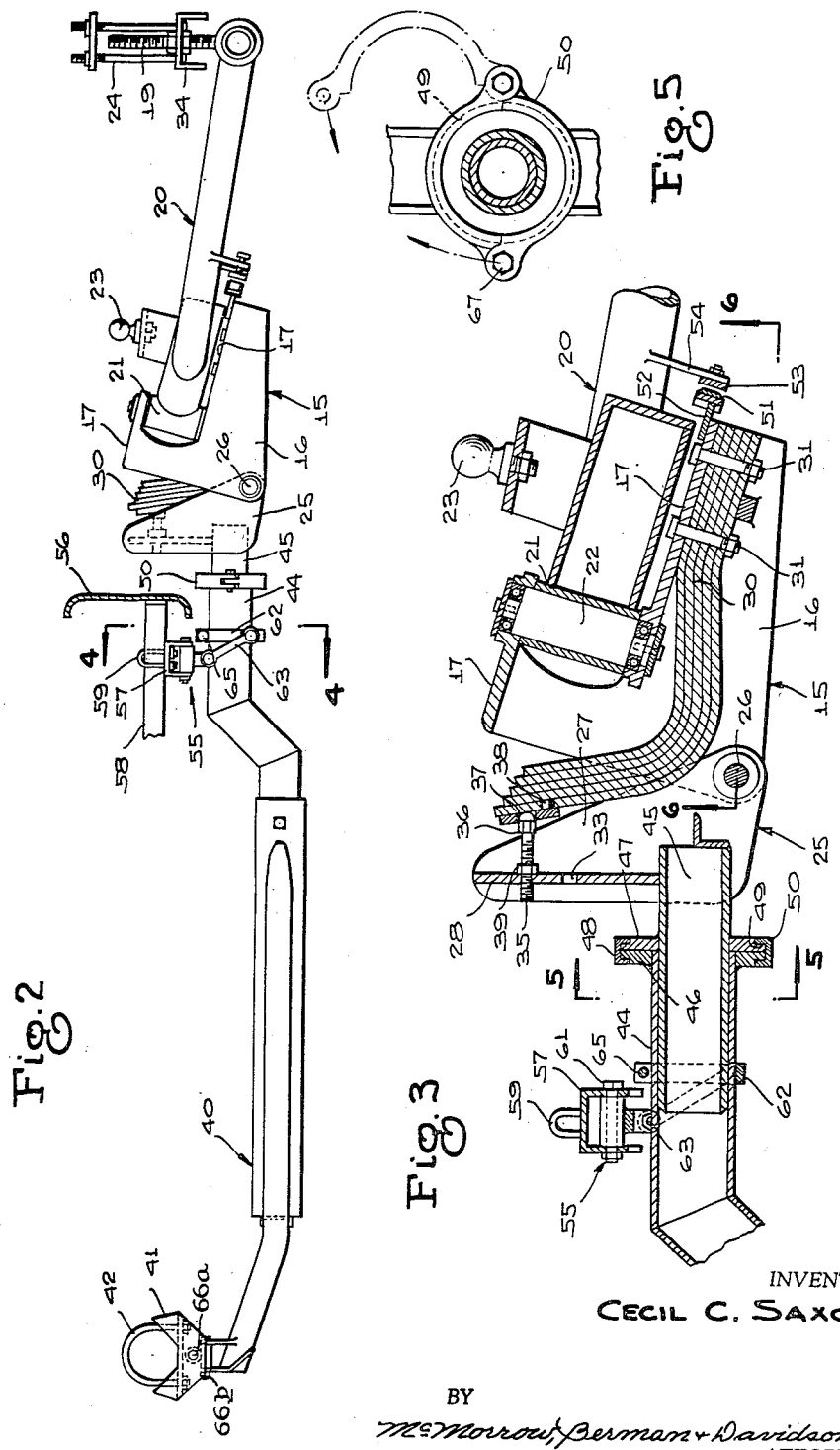
INVENTOR
CECIL C. SAXON
BY
McMorrow, Berman & Davidson
ATTORNEYS United States Patent Office 2,773,704
Patented Dec. 11, 1956

2,773,704

RESILIENT DRAFT MEANS WITH PLURAL ARTICULATION AXES

Cecil C. Saxon, Terre Haute, Ind.

Application July 30, 1954, Serial No. 446,799

5 Claims. (Cl. 280—489)

This invention relates to trailer hitches.

An object of the invention is to provide a hitch for connecting a towing vehicle and a trailer which permits limited and snubbed swinging movement of the vehicles with respect to each other to enable them to adapt themselves smoothly and with minimum strain, while moving in tandem, to turning movements and to unevenness in the surface over which they are moving.

Another object of the invention is to provide a trailer hitch which is adjustable to variations in load and balance of the vehicles connected.

Another object of the invention is to provide a trailer hitch which automatically maintains the trailer in proper alignment with the towing vehicle.

A further object of the invention is to provide a trailer hitch which is easily and quickly hooked up to connect the vehicles and unhooked to disconnect the vehicles.

Other objects and advantages of the invention will appear from the following description considered in conjunction with the attached drawings in which:

Figure 1 is a top plan view of the hitch of the present invention;

Figure 2 is a side elevational view of the assembly of Figure 1;

Figure 3 is a view taken along the line 3—3 of Figure 1, on an enlarged scale;

Figure 4 is a view taken along the line 4—4 of Figure 2, on an enlarged scale;

Figure 5 is a view taken along the line 5—5 of Figure 3; and

Figure 6 is a view taken along the line 6—6 of Figure 3.

Referring to the drawings, the reference numeral 15 designates an upstanding housing. The housing 15 has spaced side walls 16 and a stepped top 17.

Arranged longitudinally of the housing 15, is an A-shaped tongue, generally designated 20, for attachment to a trailer, which has its apex connected to the housing 15, adjacent one end thereof, for swinging movement about a vertical axis. Specifically, the apex of the tongue 20 has a sleeve 21 formed thereon which is mounted for rotary movement upon a pin 22 which extends between and is connected at its ends to the upper and lower portions of the top 17 of the housing 15. When the housing 15 is in the position it normally assumes during the use of the hitch, the pin 22 is canted slightly from the vertical with its upper end toward the tongue 20, as best shown in Figures 2 and 3. To provide for the attachment of the tongue 20 to a trailer, a hitch ball 23 is mounted upon the apex end of the tongue 20 and a pair of upright, spaced shackles 24 is mounted upon the other end of the tongue 20. The shackles 24 project upwardly from a channel bar 34 which extends transversely of and is spaced above the tongue 20, being adjustably carried on stud bolts 19 projecting upwardly from the lateral extremities of the said other end of the tongue 20.

Arranged adjacent the said one end of the housing 15, is an upstanding connector member 25 connected at its lower end to the housing 15 for rocking movement about a horizontal axis or pivot pin 26. The connector member 25 embodies a pair of spaced side walls 27 and a web 28 connecting the side walls 27 together. The housing 15 and the connector member 25 are arranged with the lower portion of the adjacent ends of their complemental side walls overlapping and the pin 26 extends through the overlapping portions to connect the housing 15 and the connector member 25 for rocking movement with respect to each other.

Positioned within the housing 15 is a leaf spring 30 which has one end affixed to the housing 15, adjacent the other end thereof and which has the portion adjacent the other end extending in an upright direction toward the connector member 25. Specifically, the one end of the spring 30 is fixed to the lower portion of the top 17 of the housing 15 by means of bolts 31 or other appropriate connecting means and the portion adjacent the other end of the spring is turned upwardly and extends out of the housing 15 and adjacent the web 28 of the connector member 25.

Bearing against the upturned end portion of the leaf spring 30 is means, carried by the connector member 25 adjacent its upper end, for holding the upturned end portion of the leaf spring 30 in its upright direction position. The means consists of a bolt 35 having a domed head 36. The bolt 35 is threadably engaged in the web 28 of the connector member 25 and the head 36 bears against the adjacent face of the spring 30, the domed portion of the head 36 being received in an aperture in a plate 37 pivotally attached to the spring 30 by a pin 38. By being turned, the bolt 35 may be adjusted transversely of the web 28 to increase or decrease the bearing pressure exerted upon the upturned end portion of the spring 30. A lock nut 39 is threadably engaged upon the bolt 35 intermediate the web 28 and the head 36 and may be tightened against the web 28 to lock the bolt 35 in any of its transverse movement positions. An internally threaded aperture 33 formed in the web 28, inwardly of the position of the bolt 35 as shown in Figure 3, affords an alternative setting for the bolt 35, making the bolt 35 adjustable longitudinally of the web 28. When the bolt 35 is placed in the aperture 33, the plate 37 is swung 180° about the pivot pin 38 so as to be positioned properly to receive the domed portion of the head 36 as it bears against the upright portion of the spring 30.

Arranged on the side of the connector member 25 remote from the housing 15, is a second A-shaped tongue 40 for attachment to a towing vehicle.

The free end of each of the legs of the tongue 40 carries a V-shaped element 41 connected to the leg end for rocking movement about a horizontal axis, or pin 66a, transverse of the tongue 40 and for rocking movement about a horizontal axis, or pin 66b, longitudinal of the tongue 40. Detachably connected to each of the elements 41, is a pair of inverted U-bolts 42, each of the V-shaped elements 41 and the associated U-bolts 42 constituting a clamp adapted to embracingly engage the rear axle housing of a towing vehicle adjacent the complemental end of the housing. Projecting longitudinally from the apex of the tongue 40 is a fixed tube 43.

A female coupling tube 44 is slidably supported in the fixed tube 43 and is secured to the fixed tube 43 by connecting means 66. A male coupling tube 45 is carried by the connector member 25 and is insertable into and withdrawable from the female coupling tube 44. As best shown in Figure 3, the male coupling tube 45 projects outwardly from the web 28 of the connector member 25 in the direction away from the spring 30.

On the female tube 44 and the male tube 45, are detachable, interlocking means for securing the tubes together. The tube 44 has a flange 46 extending outwardly therefrom and the tube 45 has a flange 47, of equal diameter, extending outwardly therefrom. The flanges 46 and 47 come into abutting engagement when the tube 45 is inserted into the tube 44, Figure 3. The edge of the flanges 46 and 47 are stepped and the portions of greatest diameter adjoin each other when the flanges abut, forming an annular ridge 48. A hinged collar 50, is provided with an internal annular groove 49 which engagingly receives the annular ridge 48 when the collar 50 is closed about the flanges 46 and 47 to hold the tubes 44 and 45 together, the collar being locked in the closed position, as shown in solid lines in Figure 5, by a nut and bolt indicated at 67. When the nut and bolt 67 are removed, the collar may be open, as shown in the broken lines in Figure 5, and removed from the flanges 46 and 47, allowing the tubes 44 and 45 to be drawn apart.

Arranged exteriorly and transversely of the end of the housing 15 adjacent the tongue 20, is a brake shoe 51 fixed to the said end of the housing 15 by a bracket 52. A means fixedly carried by the tongue 20, inwardly of its apex, makes contact with the brake shoe 51 for snubbing the swinging movement of the tongue 20. The means consists of a friction bar 53 connected at each of its ends to the adjacent leg of the tongue 20 by means of a bracket 54. The shoe 51 and the bar 53 are so positioned with respect to each other as to be in face to face frictional engagement.

The portion of the female tube 44, adjacent the flange 46, is resiliently supported from the rear bumper 56 of the towing vehicle by suspending means generally designated at 55. Uppermost of the suspending means is a cross bar 57 dependingly connected to the brackets 58 of the bumper 56 by U-bolts 59. Depending from the midportion of the cross bar 57 is an inverted U-shaped member 60 connected to the crossbar 57 for rocking movement about a horizontal axis or pin 61. Depending from the member 60 is a split ring clamp 62 connected to each leg of the member 60 by a link 63. The upper end of each link 63 is resiliently pivoted to the complemental leg of the member 60 and the lower end of each link 63 is resiliently pivoted to a complemental arm 64 projecting from the clamp 62. The clamp 62 embracingly engages the female tube 44, being tightenable thereupon by the nut and bolt means 65.

To connect a towing vehicle and a towed vehicle by a hitch of the present invention, the tongue 40 is connected to the rear axle housing of the towing vehicle, by means of the V-shaped element 41 and the U-bolts 42, and the appropriate end of the female tube 44 is inserted into the fixed tube 43 and secured therein by the bolts 66. The suspending means 55 is then connected to the brackets 58 of the bumper 56 and the clamp 62 is adjusted along the tube 44 to the appropriate place and then tightened by the nut and bolt means 65. The bolt 35 is now positioned loosely in the appropriate hole in the web 28, the top hole being used if the drawbar load of the trailer is five hundred (500) pounds or less and the lower hole being used for a drawbar load of five hundred (500) pounds or more. The tongue 20 is next connected to the drawbar of the trailer, the shackles 24 engaging the appropriate portion of the drawbar and the hitch ball 23 being received in an appropriate socket on the drawbar. The tongue 20 is then leveled with the drawbar by adjustment of the channel bar 34 and shackles 24 upon the stud bolts 19 and the male tube 45 is inserted into the female tube 44 until the flanges 46 and 47 are brought into abutting relation. The hinged collar 50 may now be closed about the flanges 46 and 47 and fastened in the closed position by the nut and bolt 67, as shown in the solid lines in Figure 5, to lock the tubes 44 and 45 together and complete the connection of the towed and towing vehicles. The bolt 35 is then tightened to put the appropriate tension upon the spring 30 to accommodate the hitch to road conditions.

To disconnect the vehicles, the bolt 35 is first loosened and then the collar 50 is unfastened and opened to the position shown in the broken lines in Figure 5 and removed from the flanges 46 and 47. The male tube 45 may now be withdrawn from the female tube 44 and the respective sections of the hitch may be detached from the towing and towed vehicles.

When a towing vehicle and a trailer are connected by the hitch of the present invention, the resilience of the spring 30 permits a limited and damped upward and downward swinging movement of the vehicles with respect to each other as they encounter unevenness in the ground surface over which they are passing. The pivotal connection of the tongue 20 to the housing 15, by means of the pin 22, permits a sidewise swinging movement of the vehicles with respect to each other as the vehicles are turned from side to side, which movement is limited and damped by the frictional contact of the brake shoe 51 and the friction bar 53. Thus the vehicles are able to adapt themselves to the movements of each other, smoothly and with a minimum of strain upon their running gears and the hitch mechanism. The canting of the pin 52 from the vertical tends to maintain the towed vehicle in proper towing alignment with the towing vehicle by the application of the caster principle and the facility with which the tension may be placed upon and released from the spring 30 by means of the bolt 35 and the ease with which the tubes 44 and 45 may be locked together and released from each other by means of the hinged collar makes the connecting and disconnecting of the towing and towed vehicles a simple and expeditious operation when the hitch of the present invention is employed.

What is claimed is:

1. A hitch comprising an upstanding housing, a tongue for attachment to a trailer arranged longitudinally of said housing and connected to said housing adjacent one end of said housing for swinging movement about a vertical axis, an upstanding connector member arranged adjacent said one end of said housing and connected to said housing for rocking movement about a horizontal axis, a leaf spring positioned within said housing and having one end fixed to said housing adjacent the other end of said housing and having the portion adjacent said one end of said housing extending in an upright direction toward said connector member, means carried by said connector member and bearing against the upright portion of said leaf spring for holding the latter in its upright position, a second tongue including a female coupling tube for attachment to a towing vehicle arranged on the side of said connector member remote from said housing, a male coupling tube fixedly carried by said connector member and insertable into and withdrawable from said female coupling tube, and detachable interlocking means on said male and female coupling tubes for securing said coupling tubes together.

2. A hitch comprising an upstanding housing, a tongue for attachment to a trailer arranged longitudinally of said housing and connected to said housing adjacent one end of said housing for swinging movement about a vertical axis, an upstanding connector member arranged adjacent said one end of said housing and connected to said housing for rocking movement about a horizontal axis, a leaf spring positioned within said housing and having one end fixed to said housing adjacent the other end of said housing and having the portion adjacent said one end of said housing extending in an upright direction toward said connector member, means carried by said connector member and bearing against the upright portion of said leaf spring for holding the latter in its upright position, a second tongue including a female coupling tube for attachment to a towing vehicle arranged on the side of said connector member remote from said housing, a male coupling tube fixedly carried by said connector member and insertable into and withdrawable from said female coupling tube, detachable interlocking means on said male and female coupling tubes for securing said coupling tubes together, and brake means on said housing and said first named tongue for snubbing the swinging movement of the first named tongue.

3. A hitch comprising an upstanding housing, an A-shaped tongue for attachment to a trailer arranged longitudinally of said housing and having its apex connected to said housing adjacent one end of said housing for swinging movement about a vertical axis, an upstanding connector member arranged adjacent said one end of said housing and connected at its lower end to said housing for rocking movement about a horizontal axis, a leaf spring positioned within said housing and having one end fixed to said housing adjacent the other end of said housing and having the portion adjacent said one end of said housing extending in an upright direction toward said connector member, means carried by said connector member adjacent the upper end and bearing against the upright portion of said leaf spring for holding the latter in its upright position, a second A-shaped tongue for attachment to a towing vehicle arranged on the side of said connector member remote from said housing, a fixed tube projecting longitudinally from the apex of said towing tongue, a female coupling tube slidably supported in said fixed tube, a male coupling tube fixedly carried by said connector member and insertable into and withdrawable from said female coupling tube, and detachable interlocking means on said male and female coupling tubes for securing said coupling tubes together.

4. A hitch comprising an upstanding housing, an A-shaped tongue for attachment to a trailer arranged longitudinally of said housing and having its apex connected to said housing adjacent one end of said housing for swinging movement about a vertical axis, an upstanding connector member arranged adjacent said one end of said housing and connected at its lower end to said housing for rocking movement about a horizontal axis, a leaf spring positioned within said housing and having one end fixed to said housing adjacent the other end of said housing and having the portion adjacent said one end of said housing extending in an upright direction toward said connector member, means carried by said connector member adjacent the upper end and bearing against the upright portion of said leaf spring for holding the latter in its upright position, a second A-shaped tongue for attachment to a towing vehicle arranged on the side of said connector member remote from said housing, a fixed tube projecting longitudinally from the apex of said towing tongue, a female coupling tube slidably supported in said fixed tube, a male coupling tube fixedly carried by said connector member and insertable into and withdrawable from said female coupling tube, and detachable interlocking means on said male and female coupling tubes for securing said coupling tubes together, a brake shoe arranged exteriorly and transversely of said housing adjacent said other end thereof and fixed to said housing, and means fixedly carried by the first named tongue inwardly of its apex and contacting said brake shoe for snubbing the swinging movement of said first named tongue.

5. A hitch comprising an upstanding housing, an A-shaped tongue for attachment to a trailer arranged longitudinally of said housing and having its apex connected to said housing adjacent one end of said housing for swinging movement about a vertical axis, an upstanding connector member embodying a pair of spaced side walls and a web connecting the side walls together arranged adjacent said one end of said housing and having its side walls adjacent the lower end connected to said housing for rocking movement about a horizontal axis, a leaf spring positioned within said housing and having one end fixed to said housing adjacent the other end of said housing and having the portion adjacent said one end of said housing extending in an upright direction toward said connector member, means carried by the web of said connector member adjustable longitudinally and transversely of said web and bearing against the upright portion of said leaf spring for holding the latter in its upright position, a second A-shaped tongue for attachment to a towing vehicle arranged on the side of said connector member remote from said housing, a fixed tube projecting longitudinally from the apex of said towing tongue, a female coupling tube slidably supported in said fixed tube, a male coupling tube fixedly carried by said connector member and insertable into and withdrawable from said female coupling tube, and detachable interlocking means on said male and female coupling tubes for securing said coupling tubes together.

References Cited in the file of this patent

UNITED STATES PATENTS

| 1,610,902 | Tomlinson | Dec. 14, 1926 |
| 2,643,891 | Mosley | June 30, 1953 |
| 2,647,761 | Kentz | Aug. 4, 1953 |
| 2,680,626 | Hedgpeth | June 8, 1954 |
| 2,685,454 | Patchett | Aug. 3, 1954 |

FOREIGN PATENTS

| 51,029 | Switzerland | Mar. 3, 1910 |